T. J. Linton,
Combustion Pump,
No. 46,683. Patented Mar. 7, 1865.
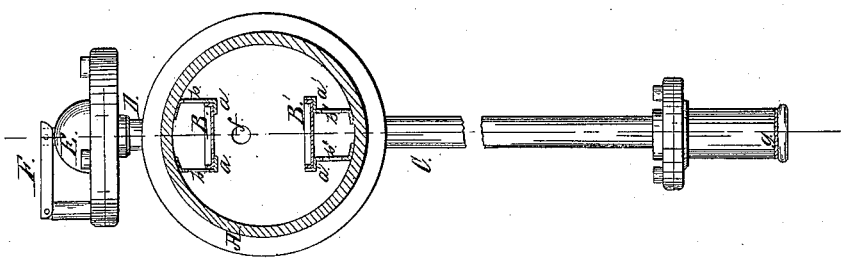
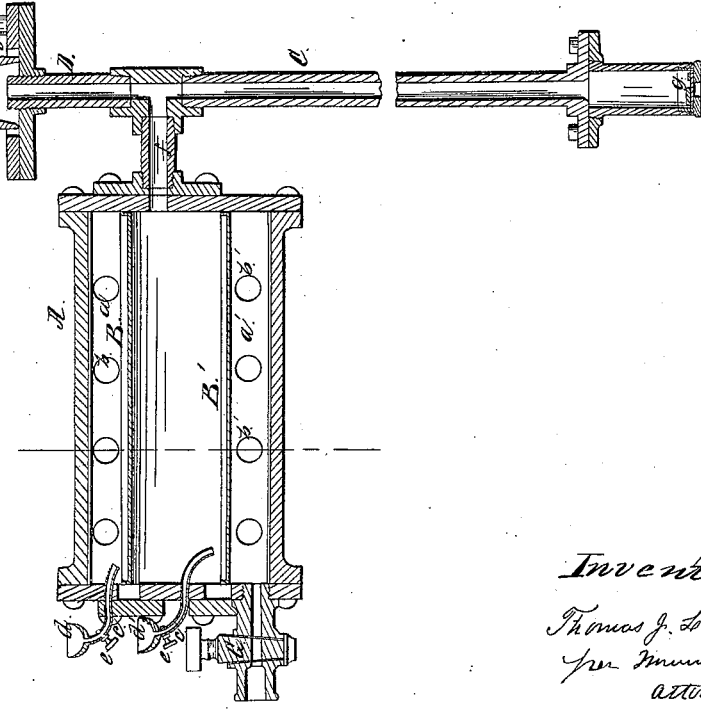

UNITED STATES PATENT OFFICE.

THOMAS J. LINTON, OF PROVIDENCE, RHODE ISLAND.

IMPROVEMENT IN PUMPS.

Specification forming part of Letters Patent No. 46,683, dated March 7, 1865.

*To all whom it may concern:*

Be it known that I, THOMAS J. LINTON, of Providence, in the county of Providence and State of Rhode Island, have invented a new and Improved Combustion-Pump; and I do hereby declare that the following is a full, clear, and exact description thereof, which will enable others skilled in the art to make and use the same, reference being had to the accompanying drawings, forming part of this specification, in which—

Figure 1 is a longitudinal vertical section of this invention. Fig. 2 is a transverse section of the same.

Similar letters of reference indicate like parts.

This invention is an improvement on that class of pumps or water-elevators in which, by the combustion of a hydrocarbon liquid, a vacuum is produced, whereby the water or other liquid, through external pressure, is caused to rise through the induction-pipe and to discharge at the desired practical point.

The invention consists in the use of steam combined with the hydrocarbon liquid in the interior of the reservoir or chamber in which the vacuum is to be produced in such a manner that by the condensation of the steam the vacuum is considerably increased and the raising or elevating of the water is materially facilitated. The water from which the steam is to be formed is placed in a shallow pan over a similar pan containing the hydrocarbon liquid in such a manner that the heat evolved by the combustion of the hydrocarbon liquid volatilizes the water and a sufficient quantity of steam is obtained to produce the desired result. The hydrocarbon liquid is measured by means of a bell-shaped or other vessel or spout attached to the supply-tube, and it is ignited by introducing into said spout, after the pan in the interior of the reservoir has been filled, a small quantity of hydrocarbon liquid and lighting the same, so that it runs into the reservoir while burning and ignites that portion of the liquid in the pan. The gaseous products of combustion are allowed to escape through the ascension-pipe, which is provided with a hinged drop-valve fitting into a cavity filled with liquid in such a manner that so soon as the gases have escaped the valve can be dropped and an air-tight joint is obtained, whereby the operation of the apparatus is not disturbed.

A represents a reservoir, which, by preference, is made in the form of a long cylinder with a comparatively small diameter, but which can be made in any other desirable form or shape. The interior of this reservoir is provided with two sets of brackets, $a a'$, one situated above the other, as shown in the drawings, and so shaped that they are capable of supporting pans B B'. These pans are made of sheet metal, with corrugated bottoms, and quite shallow, and they extend from one end of the reservoir to the other, as shown in Fig. 1. The sides of the brackets are perforated with a series of holes, $b b'$, partly for the sake of lightness and partly to allow the vapors or gases evolved from the liquids in the pans to escape freely into the reservoir. The upper pan, B, is intended to hold water, and the lower pan, B', some hydrocarbon liquid, such as naphtha or benzine. These liquids are introduced through supply-pipes $c c'$, and in order to measure off the requisite quantity of liquid for each pan said supply-pipes are provided with measuring-spouts $d d'$ and stop-cocks $e e'$, the spaces above these cocks being just large enough to hold the requisite quantities of liquid. A channel, $f$, forms the communication between the reservoir A and the induction-pipe C. This pipe may be made to extend down to a depth of about twenty feet, and it is provided with a foot-valve, $g$, opening inwardly, so that the liquid which has once passed into the pipe is not allowed to run out below. The upper end of the induction-pipe connects with the ascension-pipe D, which terminates under a valve, E, as shown in the drawings. This valve is suspended from a hinged lever, F, so that it can be readily raised or lowered, and it closes down into a well, $g'$, filled with water or other liquid, and surrounding the mouth of the ascension-pipe, so that an air-tight joint is produced when the valve is closed. A waste-faucet, G, inserted into the lower part of the reservoir A, serves to discharge from the same all the water and other fluids accumulating therein.

The operation is as follows: After the pans have been adjusted in the reservoir A the latter is closed air-tight, and the upper pan is filled with water and the lower one with naphtha or other suitable hydrocarbon liquid, the proper quantities being measured off by means of the spouts $d$ $d'$.

The stop-cocks $e$ $e'$ in the supply-pipes are closed and a small quantity of hydrocarbon liquid is poured into the spout $d'$ and ignited, and then the cock $e'$ is opened, so that the burning liquid will run down into the lower pan and ignite the liquid contained in the same. By the heat evolved from the burning hydrocarbon liquid in the lower pan the water in the upper pan is vaporized, and if the valve E is opened the air and gaseous products of combustion will escape from the reservoir, producing a hissing noise. As soon as this noise ceases the valve is dropped and a partial vacuum is formed in the interior of the reservoir, the degree of which is still further increased by the condensation of the steam previously formed by the vaporization of the water in the upper pan, and if the induction-pipe extends into water or other liquid the pressure of the atmosphere forces such liquid up and causes the same to rush out through the ascension-pipe D. A portion of the liquid thus elevated passes through the channel $f$ into the reservoir, and it is discharged through the waste-faucet G. If the discharge of liquid from the mouth of the ascension-pipe ceases, the pans B B' are again charged, respectively, with water and naphtha, and the same operation is repeated. By these means very large quantities of water can be elevated with little expense, and with an apparatus which is at once simple and not liable to get out of order. If secured on the deck of a vessel, it will supersede the use of a pump, and by its action more water can be removed from the hold of the vessel than by the best pump. Furthermore, the action of my apparatus is not made dependent upon steam, neither does it require much attention while in operation. One man is able to operate it with the greatest ease and convenience, and without being compelled to perform any tiresome labor, and for these reasons I consider my apparatus particularly valuable for men of war of all classes. When properly protected by suitable armor, it can be applied on the decks of monitors or other iron-clads with perfect safety. It may, however, be used in all cases where it is desirable to elevate a considerable quantity of water or other liquid from a depth not exceeding twenty or twenty-five feet at the highest.

By the use of shallow pans the combustion of the naphtha and the vaporization of the water is facilitated, and the corrugations in the bottoms of the pans increase their strength and their heating-surface. In such cases, where the water is not to be elevated more than six or eight feet, the vacuum produced by the combustion of the hydrocarbon liquid is sufficient to admit the desired effect; but in cases where the water is to be elevated to a greater height and a perfect vacuum, or nearly so, may be needed, the condensation of the steam in the upper pan will produce an increased effect.

The hydrocarbon liquid which I use by preference consists of a mixture of tar and naphtha in various proportions, according to the degree of vacuum to be produced, and by using a horizontal cylindrical reservoir of a comparatively small diameter the opposing pressure is reduced, and consequently the quantity of the water elevated or the height to which it can be elevated is increased to within the limit of atmospheric pressure due to a perfect or partial void.

Having thus described my invention, I claim as new and desire to secure by Letters Patent—

1. The shallow pans B B', in combination with the reservoir A and induction-pipe C, constructed substantially as set forth.

2. The producing a vacuum in the reservoir A by the combined action of hydrocarbon liquid and steam, substantially in the manner set forth.

3. The arrangement of the water-pan B and hydrocarbon-pan B' and reservoir A, whereby the combustion of the hydrocarbon liquid in the pan B' will vaporize the water in the pan B, and thereby produce a partial vacuum in the reservoir, substantially as described.

4. The measuring-spouts $d$ $d'$, applied in combination with the pans B B' and closed reservoir A, substantially as specified.

5. The method herein described of igniting the hydrocarbon liquid in the pan B' by igniting a portion of said liquid in the spout and running such ignited liquid into the reservoir A, substantially as set forth.

6. The drop-valve E, in combination with the ascension-pipe D, induction-pipe C, and reservoir A, all constructed substantially as and for the purpose described.

THOMAS J. LINTON.

Witnesses:
PHILIP LINTON,
CHAS. H. WARNER.